United States Patent
Hall (10) Patent No.: US 12,415,224 B2
(45) Date of Patent: *Sep. 16, 2025

(54) SAW GUIDE ASSEMBLY, SAW SYSTEM, AND METHODS

(71) Applicant: BAM IP Holding LLC, Saint Charles, IL (US)

(72) Inventor: Taylor James Hall, Palatine, IL (US)

(73) Assignee: BAM IP Holding LLC, Saint Charles, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/389,952

(22) Filed: Dec. 20, 2023

(65) Prior Publication Data
US 2024/0116119 A1 Apr. 11, 2024

Related U.S. Application Data

(63) Continuation of application No. 17/196,757, filed on Mar. 9, 2021, now Pat. No. 11,883,891.

(51) Int. Cl.
*B23D 47/02* (2006.01)
*B27B 9/04* (2006.01)

(52) U.S. Cl.
CPC ............... *B23D 47/02* (2013.01); *B27B 9/04* (2013.01)

(58) Field of Classification Search
CPC ... B27B 9/04; B27B 9/00; Y10T 409/306496; Y10T 83/8878; Y10T 83/667; Y10T 29/50; Y10T 409/306384; Y10T 83/7726; Y10T 83/8763; Y10T 83/0605; Y10T 83/68; B23D 59/00; B23D 45/027; B23D 45/16; B23D 51/02; B25H 1/0078; B27G 19/04; B27G 19/08; B23Q 9/0042
See application file for complete search history.

(56) References Cited

U.S. PATENT DOCUMENTS

| | | | |
|---|---|---|---|
| 3,171,451 A * | 3/1965 | Wilson | B23Q 17/2233 83/485 |
| 3,830,130 A | 8/1974 | Moore | |
| 3,915,045 A * | 10/1975 | Kitzman | B23Q 9/0042 30/376 |
| 4,023,273 A | 5/1977 | Treleaven | |

(Continued)

FOREIGN PATENT DOCUMENTS

| | | | | |
|---|---|---|---|---|
| GB | 2011834 A * | 7/1979 | | B23Q 17/2233 |
| KR | 100750309 B1 | 8/2007 | | |

(Continued)

OTHER PUBLICATIONS

Milescraft 10 IN. L Saw Guide; pages printed from the internet; known prior to May 21, 2019; https://www.acehardware.com/departments/tools/power-tools/circular-saw-accessories/2192128?x429=true&msclkid=784594d2a1b2143bd7abc98ff8d804d4&utm_source=bing&utm_medium=cpc&utm_campaign=Shopping%20-%20Catch%20All&utm_term=4581664954588628&utm_content=Catch%20All&gclid=CKWhrrWaIOQCFcCIxQldtKwPIQ.

(Continued)

*Primary Examiner* — Jonathan G Riley
(74) *Attorney, Agent, or Firm* — Reinhart Boerner Van Deuren P.C.

(57) ABSTRACT

A shuttle assembly for use with a saw guide track is provided. The shuttle assembly includes a base plate to which a saw is mounted. An alignment spacer extends laterally outward from the base plate and provides an abutment for locating a saw blade of the saw while the saw is being secured to the shuttle assembly.

19 Claims, 8 Drawing Sheets

(56) References Cited

U.S. PATENT DOCUMENTS

| | | | |
|---|---|---|---|
| 4,023,787 A | 5/1977 | Violette | |
| 4,028,976 A * | 6/1977 | Kundikoff | B23Q 9/00 83/745 |
| 4,031,794 A | 6/1977 | Leihgeber | |
| 4,051,597 A | 10/1977 | Cardoza | |
| 4,056,028 A * | 11/1977 | Patterson | B23Q 17/2233 83/745 |
| 4,059,038 A * | 11/1977 | Rietema | B23Q 9/0014 83/486.1 |
| 4,071,061 A | 1/1978 | Schneider | |
| 4,128,940 A * | 12/1978 | Ong | B23Q 9/0028 30/388 |
| 4,202,233 A * | 5/1980 | Larson | B23Q 9/0014 30/372 |
| D255,903 S | 7/1980 | Cable | |
| 4,291,602 A * | 9/1981 | Fast | B23Q 9/0014 83/745 |
| 4,335,512 A * | 6/1982 | Sheps | B23Q 9/005 30/376 |
| 4,356,748 A | 11/1982 | Tilton | |
| D268,476 S | 4/1983 | Owen | |
| 4,489,634 A * | 12/1984 | Volk | B23D 47/025 83/581 |
| 4,494,434 A * | 1/1985 | Young | B23Q 9/005 83/745 |
| 4,519,280 A | 5/1985 | Cook | |
| 4,607,434 A | 8/1986 | Francis | |
| 4,624,054 A * | 11/1986 | Edwards | B27B 25/10 30/376 |
| 4,628,608 A | 12/1986 | Kuhlmann et al. | |
| 4,790,072 A * | 12/1988 | Edwards | B27B 25/10 30/376 |
| 4,843,728 A * | 7/1989 | Francis | B23Q 9/005 33/640 |
| 5,035,061 A | 7/1991 | Bradbury et al. | |
| 5,121,554 A | 6/1992 | Havins | |
| 5,148,730 A | 9/1992 | McCaw | |
| 5,472,029 A | 12/1995 | Ketch | |
| 5,509,338 A | 4/1996 | Ekker | |
| 5,603,164 A | 2/1997 | Haddix | |
| 5,740,847 A | 4/1998 | Lasko | |
| 5,815,933 A | 10/1998 | Staniszewski | |
| 5,964,041 A | 10/1999 | Daniel | |
| 6,062,122 A | 5/2000 | Niemczyk | |
| 6,173,631 B1 | 1/2001 | Schock | |
| 6,182,371 B1 | 2/2001 | Newman | |
| 6,412,179 B1 | 7/2002 | Ende | |
| 6,591,509 B2 | 7/2003 | LeBlanc | |
| 6,725,558 B2 | 4/2004 | Gommper et al. | |
| 6,757,981 B2 | 7/2004 | Hampton | |
| 6,763,754 B1 * | 7/2004 | Glenn | B23Q 9/0042 83/745 |
| 7,059,225 B1 * | 6/2006 | Rabell | B27B 9/04 83/13 |
| 7,246,446 B2 | 7/2007 | Adkins | |
| 7,610,839 B1 * | 11/2009 | Bessette | B23Q 9/0014 30/375 |
| 8,230,611 B1 | 7/2012 | Emerson | |
| 8,359,961 B2 * | 1/2013 | Barnes | B23Q 9/0042 83/745 |
| D684,029 S | 6/2013 | Krohmer et al. | |
| 8,650,761 B2 * | 2/2014 | Haas | B25H 1/0078 30/375 |
| 9,233,464 B2 * | 1/2016 | Sherman | B25H 1/0078 |
| 9,316,477 B1 | 4/2016 | Wu | |
| 9,327,422 B2 | 5/2016 | Lounsbury | |
| D826,671 S | 8/2018 | Clark | |
| D843,191 S | 3/2019 | Clark | |
| 10,875,109 B1 * | 12/2020 | Gibson | B27B 9/04 |
| 11,052,565 B2 | 7/2021 | Strempke et al. | |
| 11,168,965 B2 | 11/2021 | Strempke et al. | |
| 11,766,803 B2 | 9/2023 | Kani et al. | |
| D1,005,076 S | 11/2023 | Hall | |
| 11,883,891 B2 * | 1/2024 | Hall | B23D 47/02 |
| 2003/0233922 A1 * | 12/2003 | Makropoulos | B23Q 9/0042 83/574 |
| 2003/0233926 A1 | 12/2003 | Makropoulos | |
| 2004/0010926 A1 * | 1/2004 | Hampton | B27B 9/04 30/374 |
| 2006/0042102 A1 * | 3/2006 | Lukens | B27B 9/04 30/388 |
| 2011/0083540 A1 * | 4/2011 | Xing | B23Q 9/0014 83/821 |
| 2012/0079931 A1 * | 4/2012 | Hansen | B23D 47/02 83/508.2 |
| 2012/0285305 A1 * | 11/2012 | Jablonsky | B23D 51/02 83/745 |
| 2014/0026725 A1 * | 1/2014 | Makropoulos | B27B 9/04 83/13 |
| 2014/0230262 A1 | 8/2014 | Lounsbury | |
| 2014/0238212 A1 * | 8/2014 | Strand | B27B 9/04 83/520 |
| 2014/0345436 A1 * | 11/2014 | Behrisch | B23D 45/16 83/745 |
| 2015/0020672 A1 * | 1/2015 | Ursell | B23D 59/00 83/821 |
| 2015/0321374 A1 * | 11/2015 | Ursell | B27B 9/04 83/821 |
| 2016/0221091 A1 * | 8/2016 | Oden | F01D 25/246 |
| 2018/0207833 A1 * | 7/2018 | Friedebach | B23D 47/02 |
| 2020/0086521 A1 * | 3/2020 | Knight | B28D 1/045 |
| 2020/0094433 A1 * | 3/2020 | Knight | B27B 9/04 |
| 2021/0178627 A1 * | 6/2021 | Ursell | B23D 47/02 |
| 2022/0288707 A1 | 9/2022 | Hall | |

FOREIGN PATENT DOCUMENTS

| | | |
|---|---|---|
| KR | 1020090116256 A | 11/2009 |
| KR | 2020180000708 U | 3/2018 |
| WO | WO 2019/233966 A1 | 12/2019 |

OTHER PUBLICATIONS

Kreg KMA2685 Rip-Cut Circular Saw Guide; pages printed from the internet; known prior to May 21, 2019; https://www.walmart.com/ip/Kreg-KMA2685-Rip-Cut-Circular-Saw-Guide/584203270?sourceid=csebr034132dcb5c7564f2eba4c87c70d0d0f83&wmlspartner=bizratecom&affcmpid=4270194736&tmode=0000&veh=cse&szredirectid=15663989198754096313310080302008005.

Kreg KMA2700 Accu-Cut Circular Saw Guide Track; pages printed from the internet; known prior to May 21, 2019; https://www.toolbarn.com/kreg-kma2700.html/?utm_source=bing&utm_medium=cpc&utm_campaign=Shopping%28BSC%29&utm_keyword=kreg-kma2700&utm_source=bing_shopping&utm_medium=cpc&utm_campaign=Shopping(BSC)&utm_term=shopping&utm_content=BZrkOibj_pcrid_11075488888_pkw_pmt_pdv_c_product_kreg-kma2700_&msclkid=035b5154d708100b80170c098eefe6b7.

Kreg KMA2600 Square Cut; pages printed from the internet; known prior to May 21, 2019; https://www.walmart.com/ip/Kreg-KMA2600-Square-Cut/15692112?sourceid=csebr03e4f31bfb420e4de2ad831c613b373061&wmlspartner=bizratecom&affcmpid=3381002264&tmode=0000&veh=cse&szredirectid=15663990475705486601210070301008005.

Johnson 98 in. Aluminum Cutting Guide; pages printed from the internet; known prior to May 21, 2019; https://www.walmart.com/ip/98-in-Aluminum-Cutting-Guide/369052540?wmlspartner=wmtlabs&adid=22222222222238272884&wmlspartner=wmtlabs&wl0=e&wl1=0&wl2=c&wl3=74973029305809&wl4=pla-4578572595324056:aud-807615483&wl5=&wl6=&wl7=&%20wl10=Walmart&wl12=369052540_10000001205&wl14=Johnson%20Aluminum%20Cutting%20Guide%20-%20%2430.00%20for%2098%E2%80%9D&veh=sem&msclkid=e4f6780093fe11fc748a255dc9a7e3a7.

FEStool FS-1400/2 55" Guide Rail (1,400 MM); pages printed from the internet; known prior to May 21, 2019; https://www.amazon.com/Festool-FS-1400-Guide-Rail-400/dp/B001495RZE/ref=pd_lpo_sbs_469_t_1?_encoding=UTF8&psc=1&refRID=H01F8RFJJYPM2WWN1XSJ.

(56) References Cited

OTHER PUBLICATIONS

Bora WTX Router Dado Jig, the Woodworking Router Guide That Allows for Precise, Straight Dados, Rabbets, and Mortises, 542005; pages printed from the internet; known prior to May 21, 2019; https://www.amazon.com/Bora-542005-Woodworking-Straight-Mortises/dp/B01FJLKQ2Q/ref=sr_1_1_sspa?ie=UTF8&qid=1545413228&sr=8-1-spons&keywords=bora+router+guide&psc=1.

Bora Jigsaw Guide for WTX Clamp Edge. Use for Making Straight Cuts & as a Steady Guide for Your Jigsaw; pages printed from the internet; known prior to May 21, 2019; https://www.amazon.com/Bora-542009-Jigsaw-Guide/dp/B01BBIURUW/ref=sr_1_3?ie=UTF8&qid=1545414019&sr=8-3&keywords=bora+jigsaw+guide.

Bora 542008 Circular Saw Plate and Rip Guide System. Everything You Need to Make Straight Cuts of Any Length up to 24" Wide; pages printed from the internet; known prior to May 21, 2019; https://www.amazon.com/Bora-542008-Circular-Everything-Straight/dp/B0161NHOVC/ref=sr_1_1_sspa?ie=UTF8&qid=1545414852&sr=8-1-spons&keywords=bora+rip+guide&psc=1.

Steelex—24" Saw Guide Rail; pages printed from the internet; known prior to May 21, 2019; https://www.grizzly.com/products/Steelex-24-Saw-Guide-Rail/D3702?msclkid=dd6dccc6131d152548ad919b48473a1c&adlclid=ADL-5223dd20-1a9c-48d7-8b5d-3b37a278ab8a.

Bench Dog Pro-Cut Portable Saw Guide; pages printed from the internet; known prior to May 21, 2019; https://www.rockler.com/bench-dog-pro-cut-portable-saw-guide.

Dremel Saw-Max SM840 Miter Cutting Guide; pages printed from the internet; known prior to May 21, 2019; https://www.amazon.com/Dremel-Saw-Max-SM840-Miter-Cutting/dp/B005JRJFSW/ref=asc_df_B005JRJFSW/?tag=bingshoppinga-20&linkCode=df0&hvadid={creative}&hvpos={adposition}&hvnetw=o&hvrand={random}&hvpone=&hvptwo=&hvqmt=e&hvdev=c&hvdvcmdl={devicemodel}&hvlocint=&hvlocphy=&hvtargid=pla-4584001419077934&psc=1.

Bosch JA1010 Jig Saw Guide for Circular and Parallel Cutting; pages printed from the internet; known prior to May 21, 2019; https://www.amazon.com/Bosch-JA1010-Circular-Parallel-Cutting/dp/B00BD5G8A2.

Empire 98 IN. Professional Cutting Guide; pages printed from the internet; known prior to May 21, 2019; https://www.acmetools.com/shop/tools/empire-level-98-inch-all-purpose-cutting-guide-e902?cm_mmc=Google-_-PRODUCTFEED-_-EMPIRE%20LEVEL-_-E902&CAWELAID=600009240000041174&CAGPSPN=pla{ifdyn:dyn}&CAAGID=1213860897153974&CATCI=pla-4579465930132260&CATARGETID=600009240005369360&CADEVICE=c&msclkid=dc51c381ef2a19fa68989edcb304a3e2&utm_source=bing&utm_medium=cpc&utm_campaign=CA%20Bing%20Shopping&utm_term=4579465930132260&utmcontent=GS_empire%20level.

Dewalt DWS5100 12-Inch Dual-Port Folding Rip Guide; pages printed from the internet; known prior to May 21, 2019; https://www.amazon.com/DEWALT-DWS5100-12-Inch-Dual-Port-Folding/dp/B003JQJYGS.

FEStool 495717 Parallel Guides for Guide Rail System; pages printed from the internet; known prior to May 21, 2019; https://www.festoolproducts.com/festool-495717-parallel-guides-for-guide-rail-system.html?utm_source=google shopping&msclkid=b871556b491d17581d83083615706e09.

EZSmart Universal Edge Guide With Universal Saw Base; pages printed from the internet; known prior to May 21, 2019; https://www.eurekazone.com/product-p/ezuegsb1.htm.

True Trac 813SAP Universal Adapter Plate; pages printed from the internet; known prior to May 21, 2019; https://www.toolnut.com/true-trac-813sap-universal-adapter-plate.html?utm_source=google_shopping.

Jig Saw Plate for 3260-3290 Circle Jigs; pages printed from the internet; known prior to May 21, 2019; https://woodhaven.com/products/jig-saw-plate-for-3260-3290-circle-jig?variant=6386099716123&gclid=Cj0KCQiAjZLhBRCAARIsAFHWpbEkaaxYS506RbR_Z-gLBcpPvXEVQjyD50CuE-ydRg4V4MYgHpKd4hwaAiZJEALw_wcB.

Accu-Rip Accu-Rip Circular Saw Rip Guide; pages printed from the internet; known prior to May 21, 2019; https://www.lowes.com/pd/Accu-Rip-Accu-Rip-Circular-Saw-Rip-Guide/3028906.

\* cited by examiner

SAW GUIDE ASSEMBLY, SAW SYSTEM, AND METHODS

CROSS-REFERENCE TO RELATED PATENT APPLICATIONS

This patent application is a continuation of U.S. patent application Ser. No. 17/196,757, filed Mar. 9, 2021, which is now, the entire teachings and disclosure of which are incorporated herein by reference thereto.

FIELD OF THE INVENTION

This invention generally relates to track saws.

BACKGROUND OF THE INVENTION

Track saw systems use a track and shuttle assembly for guiding a saw along a predetermined path. This can provide for highly accurate cutting of a workpiece. Some track saw systems have dedicated saws that are not used for other activities. Some track saw systems convert a saw used for other actives into a track saw. For example, a handheld circular saw may be used in a track saw system to gain improved cutting accuracy, e.g. straighter cuts, than using the circular saw free-handed.

To provide accurate and good cuts with these modified circular saws, it is important that the saw blade is properly oriented relative to the shuttle assembly that slides along the track.

In many systems, the shoe of the circular saw (i.e. the portion of the circular saw that rests on top of a workpiece) is abutted against an abutment of the shuttle assembly to orient the saw relative to the shuttle. Unfortunately, the position of the shoe in many circular saws has a low tolerance relative to the position of the saw blade, even prior to use. Further, circular saws are often dropped or can become otherwise damaged when they are on a worksite. This can further affect the orientation of the saw blade relative to the shoe.

The present disclosure provides improvements in the art related to track saw systems.

BRIEF SUMMARY OF THE INVENTION

In one example, a shuttle assembly for use with a saw guide track for guiding a saw having a saw blade along a predetermined path is provided. The shuttle assembly includes a base plate, a guide arrangement, a saw attachment arrangement, and an alignment spacer. The base plate has opposed top and bottom sides, opposed first and second ends, and a lateral side extending between the first and second ends. The guide arrangement is configured to engage the saw guide track to prevent lateral movement of the base plate as the base plate travels along the predetermined path. The guide arrangement defines a guide axis that is parallel to the predetermined path when the base plate travels along the predetermine path. The saw attachment arrangement attaches the saw to the top side of the base plate with the saw extending laterally outward beyond the lateral side such that the saw blade can extend downward beyond the bottom side of the base plate. The alignment spacer has a saw blade abutment. The alignment spacer being fixable relative to the base plate such that the saw blade abutment is spaced laterally outward from the lateral side.

In one example, the alignment spacer is also movable relative to the base plate once a saw has been attached to disengage the saw blade from the alignment spacer.

In one example, the alignment spacer is removably attachable to the base plate.

In one example, the base plate has a groove formed in the bottom side. The alignment spacer includes an attachment feature in the form of a mounting head matable with the groove. The mounting head is laterally spaced from the saw blade abutment.

In one example, the alignment spacer includes an attachment feature in the form of threaded holes or threaded studs that can cooperate with corresponding attachment features of the base plate.

In one example, the mounting head is elongated parallel to the guide axis and prevents pivotal movement of the alignment spacer relative to the base plate along any axis that is non-parallel to the guide axis.

In one example, an attachment arrangement between the alignment spacer and the base plate fixes the lateral spacing of the saw blade abutment and maintains the saw blade abutment parallel to the guide axis.

In one example, the alignment spacer includes: a main body portion; a downward depending flange portion extending downward from the main body and defining the saw blade abutment; and an attachment feature for affixing the alignment spacer to the base plate. The main body portion extends between and interconnects the downward depending flange and the attachment feature.

In one example, the alignment spacer further includes an upward extending flange extending upward from the main body portion. The upward extending flange is laterally between the downward depending flange and the attachment feature. The upward extending flange is spaced from the attachment feature and the downwardly depending flange. The upward extending flange abuts the bottom side of the base plate when the alignment spacer is attached to the base plate.

In one example, the attachment feature is an upward extending projection that extends upward beyond a top surface of the main body portion.

In one example, the upward extending flange, downward depending flange, attachment feature and main body portion are all formed from a single continuous piece of material.

In one example, an axial length of the saw blade abutment is less than an axial length of the base plate between the first and second ends.

In one example, the saw attachment arrangement is at least one clamp that presses a shoe of the saw against the top of the base plate to secure the saw to the base plate.

In an example, a saw guide system includes a shuttle assembly as outlined above and a saw guide track configured to mate with the shuttle. The shuttle is slidable relative to the saw guide track along the predetermined path.

In one example, the saw guide track has a length parallel to the guide axis that is greater than a length of the base plate between the first and second ends.

In one example, a saw system includes a saw guide system as outlined above and a saw. The saw has a saw blade and a shoe. The saw blade extends downward beyond a bottom side of the shoe. The shoe rests on the top of the base plate when the saw attachment arrangement secures the saw to the shuttle assembly.

In an example, a method of mounting a saw to a shuttle assembly as outlined above is provided. The method includes positioning the alignment spacer such that the saw blade abutment is spaced laterally outward from the lateral side of the base plate; a butting a saw blade of the saw against the saw blade abutment of the alignment space; securing the saw to the base plate using the saw attachment arrangement; and moving the alignment spacer relative to the base plate to disengage the saw blade from the alignment spacer.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
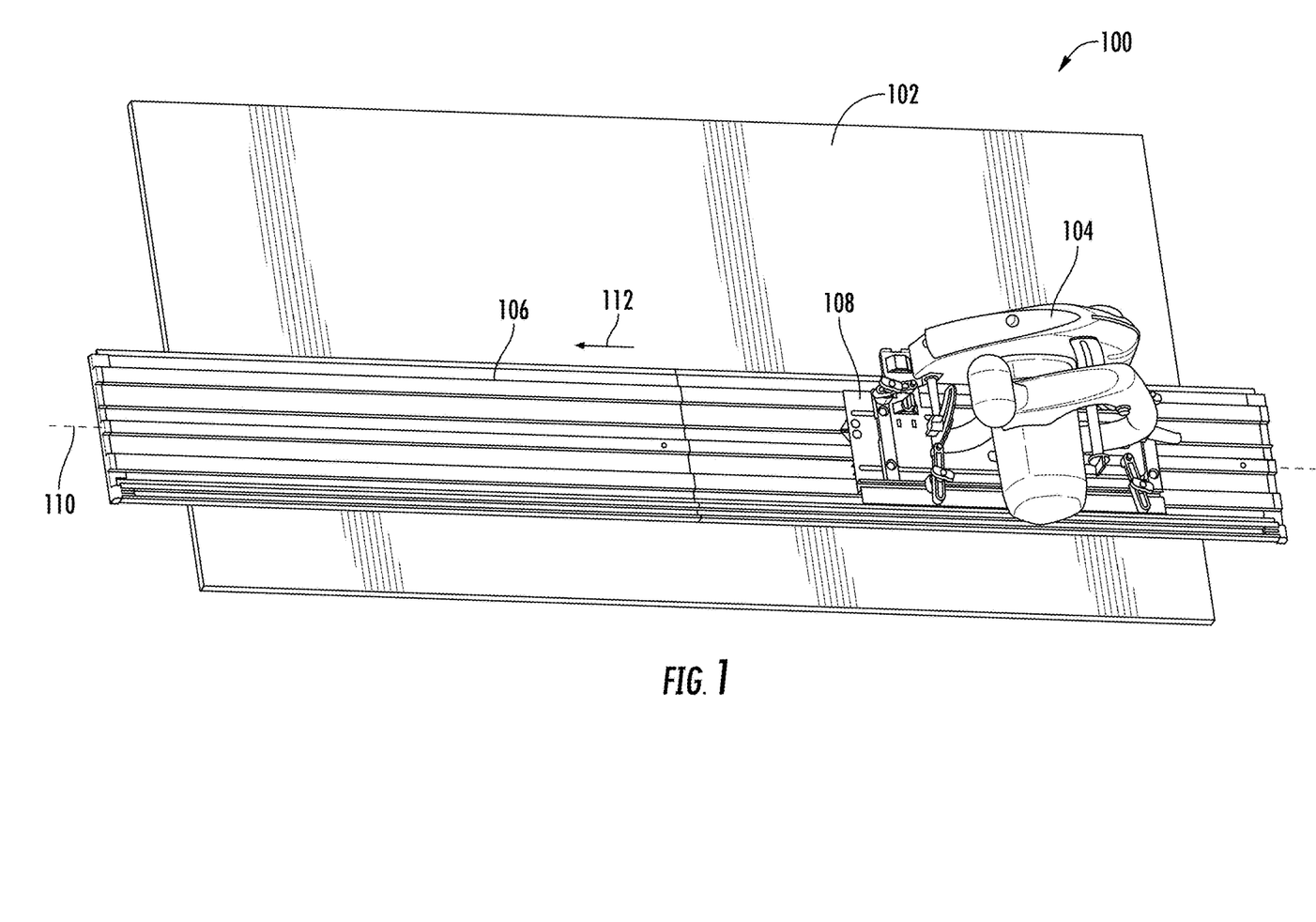
FIG. 1 is a perspective illustration of a saw system according to an example of the disclosure.

FIG. 1 illustrates a saw system 100 according to an example of the disclosure. The saw system 100 is configured to provide accurate cutting of workpiece 102 by saw 104.

The saw system 100 generally includes saw 104, saw guide track 106 (also referred to herein simply as track 106), and a shuttle assembly 108. The saw guide track 106 and shuttle 108 may be considered a "saw guide system 109." In this example, the saw 104 is affixed to the shuttle assembly 108 and the shuttle assembly 108 is slidable (illustrated by arrow 112) relative to the track 106 along a predetermined path. Typically, the predetermined path is a linear path illustrated by axis 110.

The shuttle assembly 108 and saw guide track 106 cooperate with one another to prevent substantially any lateral movement relative to axis 110 or angular movement therebetween such that saw 104 is precisely guided along the predetermined path.

The track 106 may be formed by one or more sections. The track 106 in this example is formed from a pair of interconnected sections.

Figure 2:
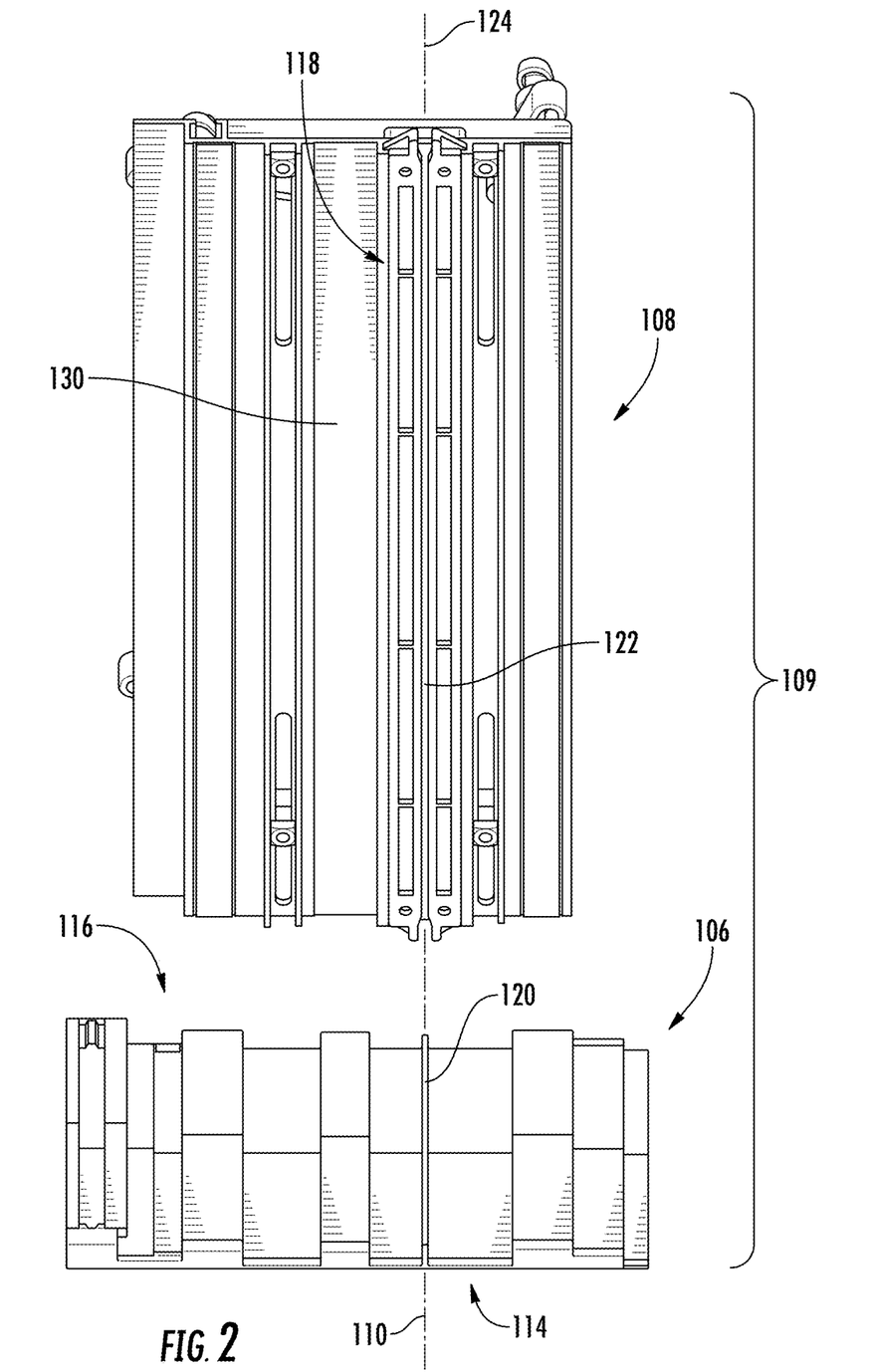
FIG. 2 is a perspective view of the saw guide system of the saw system of FIG. 1 illustrating the bottom of the shuttle assembly and a top of the saw guide track.

With additional reference to FIG. 2, the track 106 has a bottom 114 that rests on the workpiece to be cut and a top 116 upon which the shuttle assembly 108 rests.

The shuttle assembly 108 includes a guide arrangement 118 that mates with a corresponding guide member 120 of the track 106. In this example, the guide arrangement 118 includes a groove 122 that receives the guide member 120. The guide member 120 is in the form of an upstanding wall that is sized to the width of the groove 122 to eliminate clearance between the guide arrangement 118 and the guide member 120 and promote an accurate cut as the shuttle assembly 108 slides along track 106.

The groove 122 defines a guide axis 124 that is parallel to path 110. Again, the cooperation of guide member 120 and guide arrangement 118 prevents lateral movement, e.g. perpendicular to axes 124, 110, of the shuttle assembly 108 relative to track 106.

In this example, the track 106 is formed from metal, such as extruded aluminum, and the guide arrangement 118 is formed from plastic, preferably a plastic that has low frictional characteristics relative to track 106.

Figure 3:
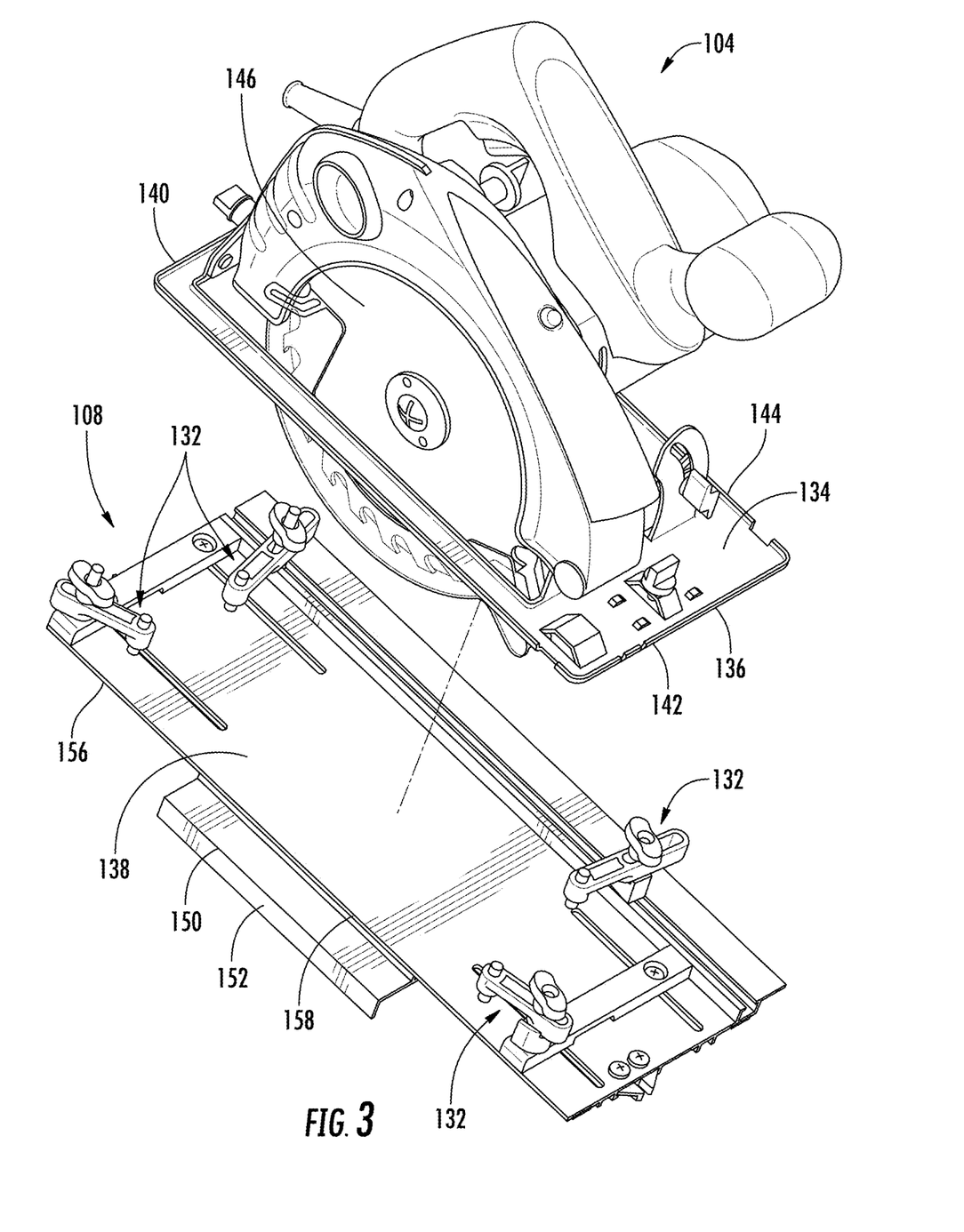
FIG. 3 is an exploded illustration of the saw and shuttle assembly of the system of FIG. 1.

With reference to FIG. 3, the shuttle assembly 108 includes a base plate 130 and a saw attachment arrangement as well as guide arrangement 118. The guide arrangement 118 in this example is provided by a separate body secured to the base plate 130. However, in other examples, the guide arrangement 118 could be directly formed by the base plate 130.

The saw attachment arrangement is provided by a plurality of clamps 132. The clamps 132 provide axial loading to the shoe 134 of the saw 104 to press the bottom 136 of the shoe 134 against a top 138 of the base plate 130.

When the saw guide system 109 isn't used with saw 104, the bottom 136 of shoe 134 will rest on a top surface of a workpiece when the user cuts the workpiece, such as when the user simply uses sight to align the saw 104 with a desired cutting path.

The saw attachment arrangement (e.g. clamps 132) of this example allow for adjustably positioning the saw 104 relative to the base plate 130. The saw attachment arrangement also allows for saws with different sized or shaped shoes 134 to be easily mounted to the base plate 130.

In the past, a user would typically abut one of the ends 140, 142 or side 144 of the shoe 134 against an abutment of the shuttle assembly 108 to attempt to properly align the saw 104, and particularly saw blade 146 thereof, relative to the shuttle assembly 108.

Unfortunately, the relative orientation of the saw blade 146 relative to the shoe 134 is typically not held to high tolerances. Further, the relative orientation of the saw blade 146 to the shoe 134 can change over time due to wear or damage such as if the saw were dropped. Thus, ends 140, 142 are often not perpendicular to the cutting plane of saw blade 146 and side 144 is often not parallel to the cutting plane of saw blade 146. As such, using the shoe 134 as a reference point for mounting the saw 104 to the shuttle assembly 108 has been determined to provide a source of inaccuracy when using a saw guide system of the type similar to saw guide system 109.

Figure 4:
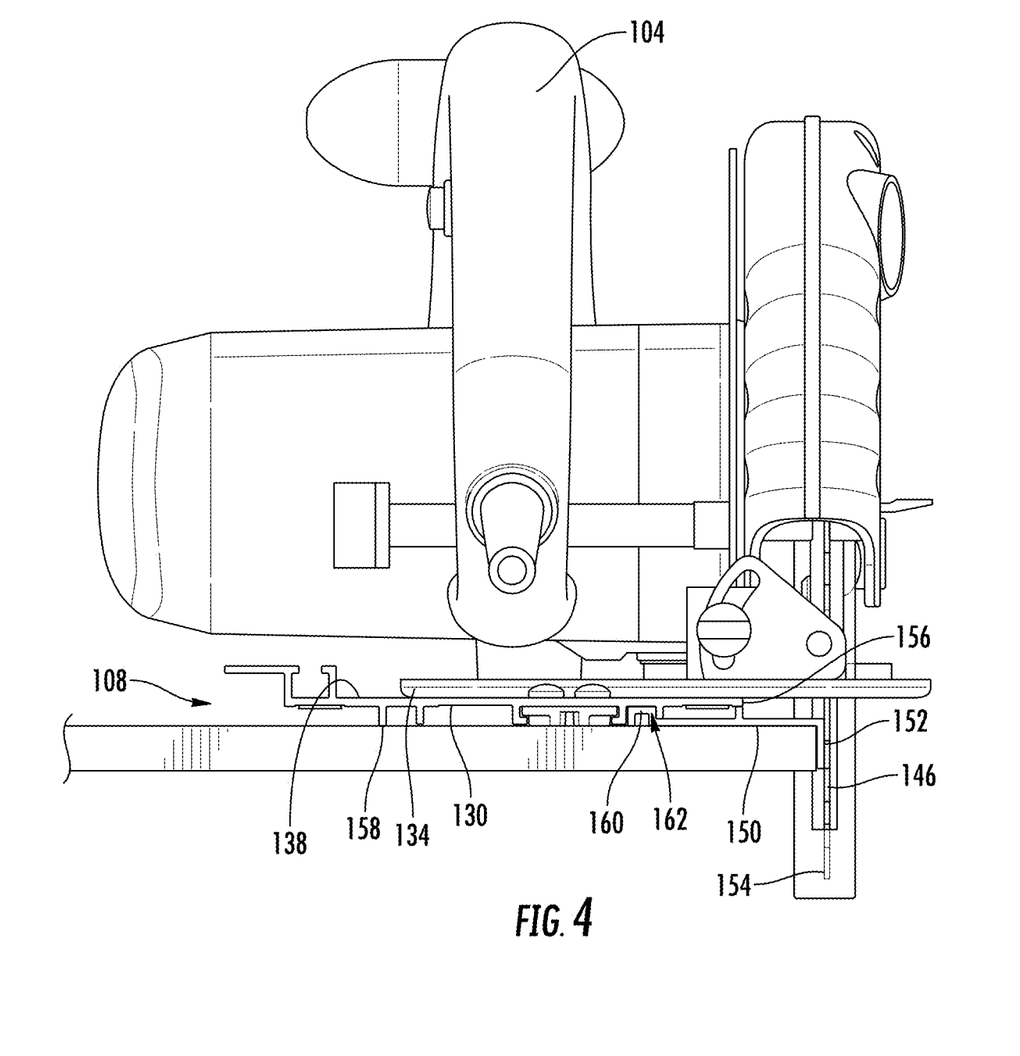
FIG. 4 is an end view of the saw and shuttle assembly of FIG. 3 in an assembled configuration.
Figure 5:
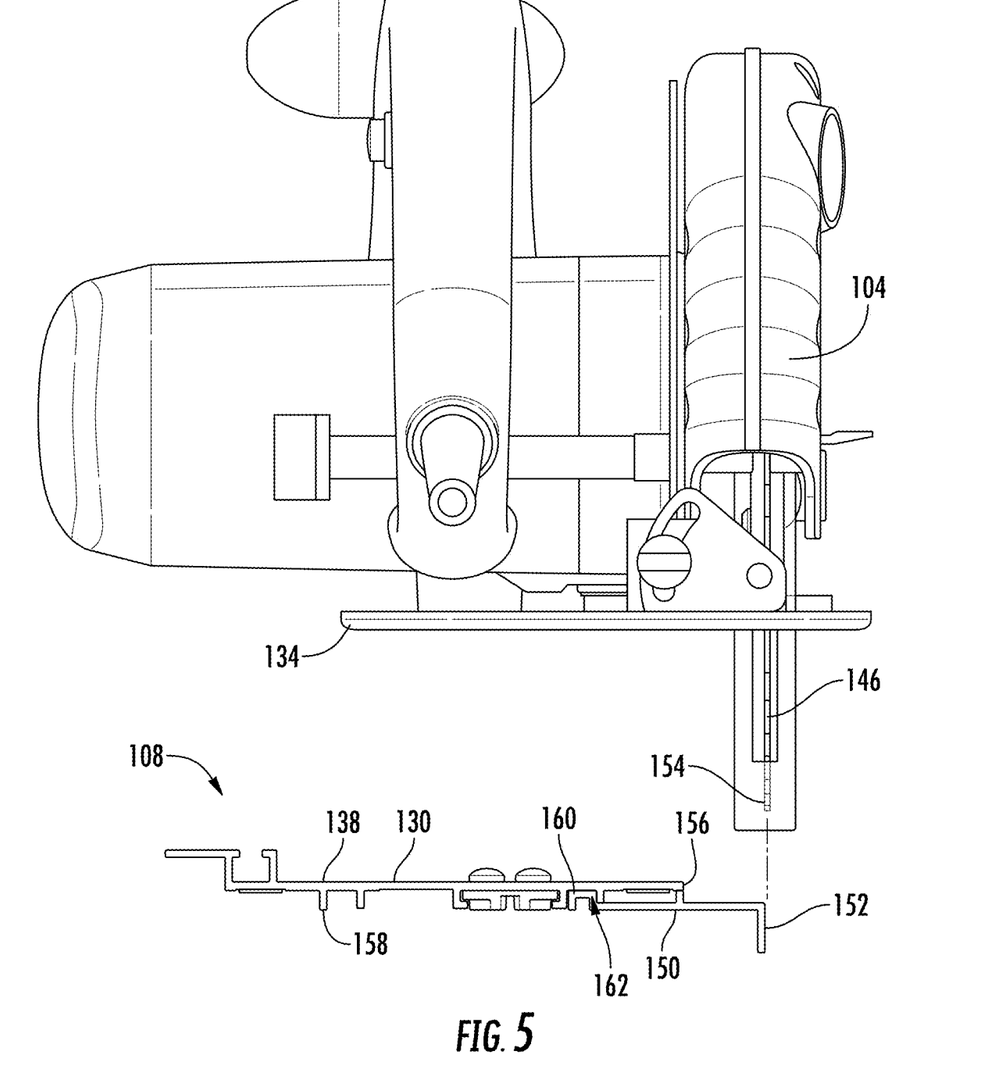
FIG. 5 is an end view illustration of FIG. 4 with the saw and shuttle assembly disconnected from one another.
Figure 6:
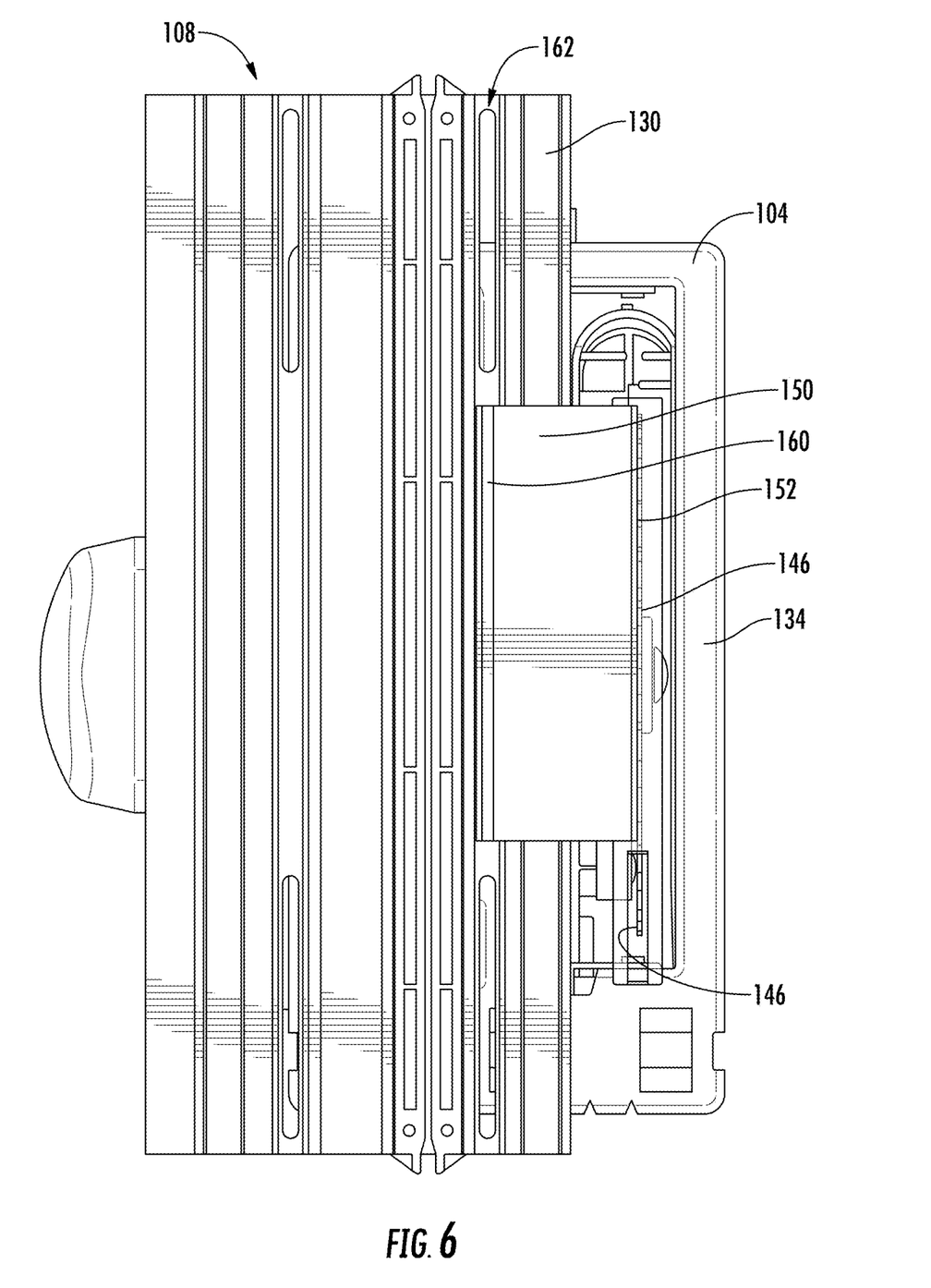
FIG. 6 is a bottom view of the saw and shuttle assembly illustrating the alignment spacer in place for mounting the saw to the shuttle assembly.

With additional reference to FIGS. 4-6, an alignment spacer 150 is provided to rectify this issue. The alignment spacer 150 includes a saw blade abutment 152 against which an inner side 154 of the saw blade 146 abuts while the user secures the saw 104 to the shuttle assembly 108.

Here, the saw blade 146 is directly used to locate and orient the saw blade 146 relative to the base plate 130 of the shuttle assembly 108.

Once the saw 104 is secured to the shuttle assembly 108, the alignment spacer 150 can be removed or otherwise moved out of engagement with the saw blade 146.

The alignment spacer 150 is configured to laterally offset the saw blade abutment 152 from lateral side 156 of the base plate 130 of the shuttle assembly 108. Thus, when the saw 104 is attached to the shuttle assembly 108, the saw 104 will extend laterally outward beyond lateral side 156 such that the saw blade 146 can extend downward below bottom 158 of the base plate 130.

In this example, the alignment spacer 150 is removably attachable to the base plate 130. It is contemplated that in other examples, the alignment spacer 150 could simply slide laterally inward rather than be removed when the shuttle assembly 108 is used with track 106.

However, regardless of how the alignment spacer 150 is moved out of the way for use of the saw 104, the alignment spacer needs to be laterally fixable relative to the base plate 130 during mounting of the saw 104.

In this example, the saw blade abutment 152 defines an abutment plane that is parallel to the guide axis 124 of the guide arrangement 118. This properly orients the saw blade 146 of the saw 104 relative to the guide axis 124.

Figure 7:
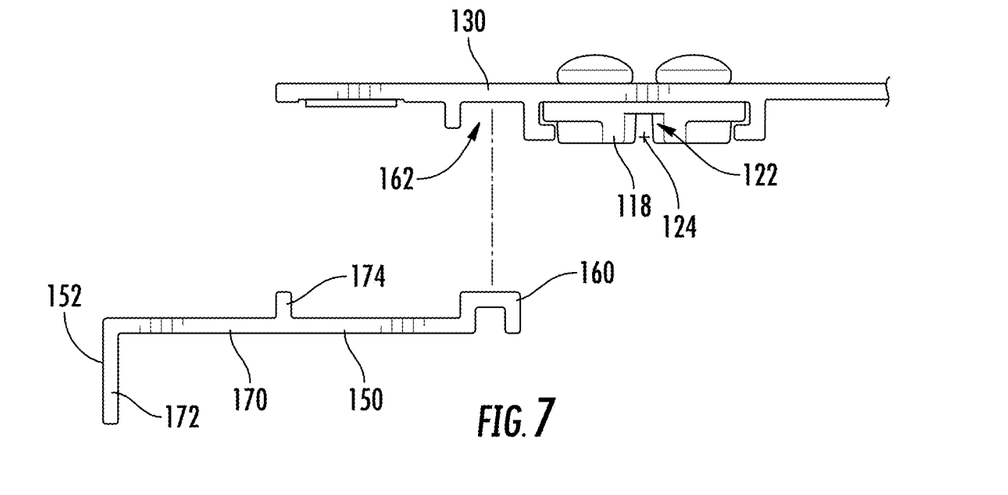
FIGS. 7 and 8 illustrate the shuttle base plate and alignment spacer of the shuttle assembly of FIGS. 5 and 6.
Figure 8:
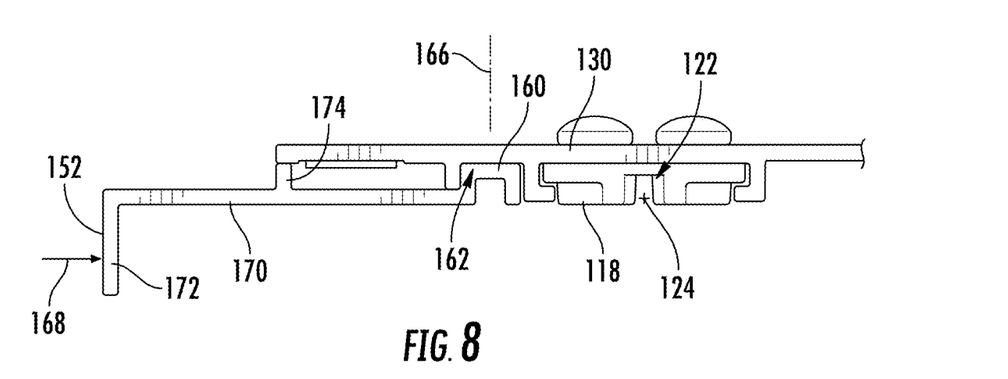

With additional reference to FIGS. 7 and 8, in this example, the alignment spacer 150 includes an attachment feature in the form of a mounting head 160 to orient and secure the alignment spacer 150 to the base plate 130. The mounting head 160 is matable with a groove 162 formed in an underside of base plate 130.

Preferably, the mounting head 160 is sufficiently elongated relative to the size and shape of groove 162 such that the mounting head 160 does not move laterally relative to guide axis 124 within groove 162 nor does mounting head 160 twist angularly about an axis 166 perpendicular to guide axis 124 when lateral inward directed pressure, illustrated by arrow 168 in FIG. 8, is applied to the alignment spacer 150.

With reference to FIG. 8, the alignment spacer 150 includes a main body portion 170, a downward depending flange portion 172 that defines saw blade abutment 152, and an attachment feature in the form of mounting head 160. Further, in this example, a support rib 174 formed by an upward extending flange is positioned laterally between flange portion 172 and mounting head 160. The support rib 174 presses on an underside of base plate 130 for added stability.

The downward depending flange portion 172 can be hooked over an edge of a workpiece or a workbench while mounting the saw 104 to the shuttle assembly 108. This further stabilizes the shuttle assembly 108 during mounting and allows the saw blade to extend downward below the base plate 130.

In the illustrated example, the downward depending flange portion 172, the main body portion 170, the downward depending flange portion 172 and the support rib 174 are formed from a continuous piece of material, such as being molded as a single body, such as being extruded, or being machined from a single piece of material.

Figure 9:
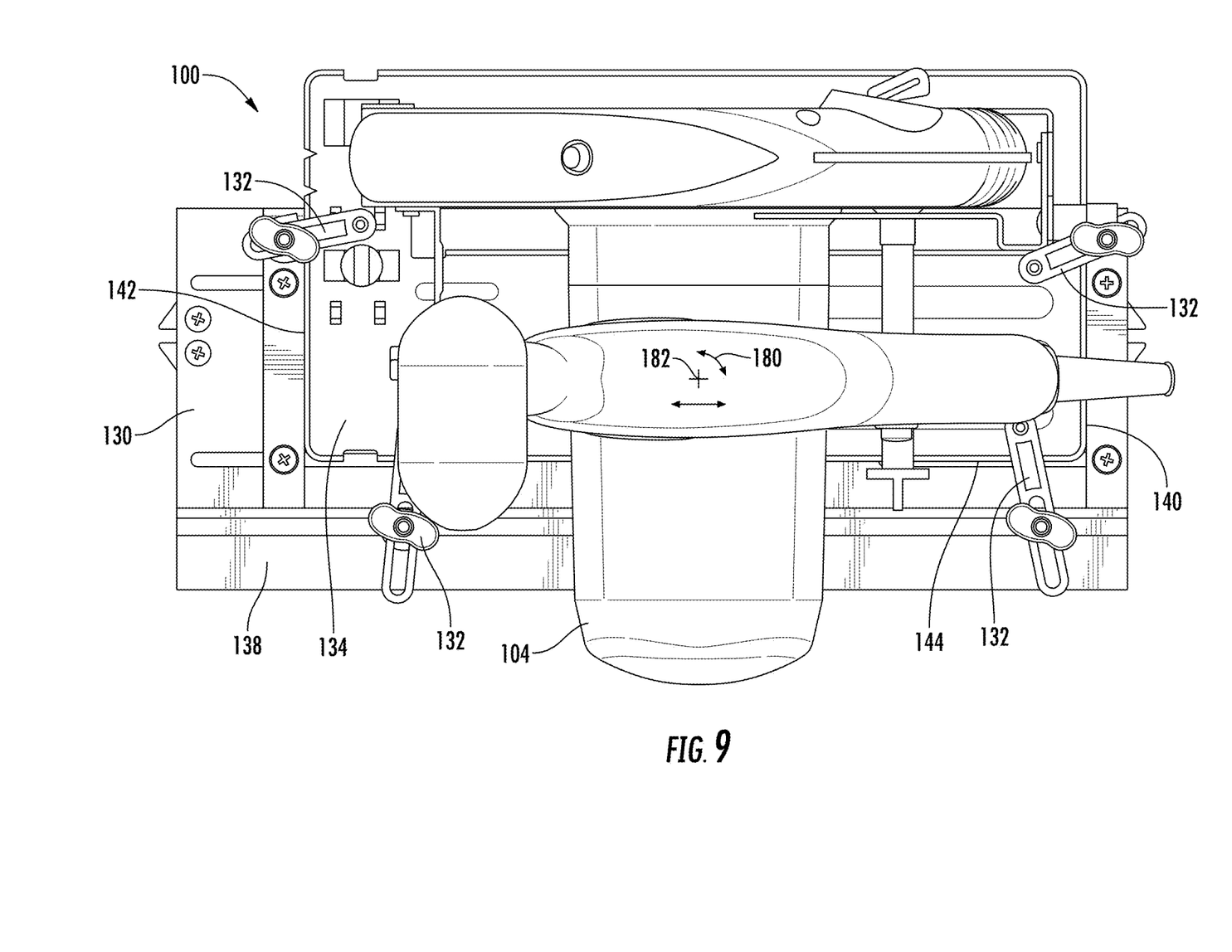
FIG. 9 is a top view illustration of the saw attached to the shuttle assembly.

FIG. 9 illustrates the saw 104 attached to the shuttle assembly 108 using clamps 132 pressed axially against a top of the shoe 134.

By using the clamps 132, the position of the saw 104 can be adjusted relative to base plate 130 angularly such as illustrated by arrow 180 about axis 182 or linearly as illustrated by arrow 184.

In this example, the length of the base plate 130 is less than the length of the track 106 of the segments of the track 106. Further, the length of the alignment spacer 150 is less than the length of the base plate 130.

A method of mounting a saw 104 to the shuttle assembly includes positioning the alignment spacer 150 such that it extends laterally outward beyond side 156 of the base plate 130. Abutting a saw blade 146 against the saw blade abutment 152 of the alignment spacer 150 and then securing the saw 104 to the base plate 130. Thereafter, the alignment spacer 150 is disengaged from the saw blade 146.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A saw guide assembly for guiding a saw having a saw blade along a path, the saw guide including:
   a base plate having opposed top and bottom sides, opposed first and second ends, and a lateral side extending between the first and second ends;
   a saw attachment arrangement for adjustably attaching the saw to the top side of the base plate with the saw extending laterally outward beyond the lateral side such that the saw blade can extend downward beyond the bottom side of the base plate; and
   an alignment spacer having a saw blade abutment, the alignment spacer being engageable with the base plate such that the saw blade abutment against which the saw blade abuts while the user secures the saw to the base plate, is spaced laterally outward from the lateral side and such that the saw blade abutment is fixed along a second axis being perpendicular to the path when the alignment spacer is engaged with the base plate.

2. The saw guide assembly of claim 1, wherein the alignment spacer is removably attachable to the base plate.

3. The saw guide assembly of claim 1, wherein:
the base plate has a groove formed in the bottom side;
the alignment spacer includes an attachment feature in the form of a mounting head matable with the groove, the mounting head being laterally spaced from the saw blade abutment; and
mating of the mounting head with the groove prevents the alignment spacer from moving laterally relative to the base plate along the second axis.

4. The saw guide assembly of claim 3, wherein the mounting head is elongated parallel to the path and prevents pivotal movement of the alignment spacer relative to the base plate along any axis that is non-parallel to the path.

5. The saw guide assembly of claim 1, further comprising an attachment arrangement between the alignment spacer and the base plate fixing the lateral spacing of the saw blade abutment and maintaining the saw blade abutment parallel to the path.

6. The saw guide assembly of claim 5, wherein the alignment spacer includes:
a main body portion;
a downward depending flange portion extending downward from the main body and defining the saw blade abutment; and
an attachment feature for laterally affixing the alignment spacer to the base plate, the main body portion extending between and interconnecting the downward depending flange and the attachment feature.

7. The saw guide assembly of claim 6, wherein the alignment spacer further includes an upward extending flange extending upward from the main body portion, the upward extending flange being laterally between the downward depending flange and the attachment feature and being laterally spaced from the attachment feature and the downwardly depending flange, the upward extending flange abutting the bottom side of the base plate when the alignment spacer is attached to the base plate.

8. The saw guide assembly of claim 6, wherein the attachment feature is an upward extending projection that extends upward beyond a top surface of the main body portion.

9. The saw guide assembly of claim 7, wherein the upward extending flange, downward depending flange, attachment feature and main body portion are all formed from a single continuous piece of material.

10. The saw guide assembly of claim 1, wherein an axial length of the saw blade abutment is less than an axial length of the base plate between the first and second ends.

11. The saw guide assembly of claim 1, wherein the saw attachment arrangement is at least one clamp that presses a shoe of the saw against the top of the base plate to secure the saw to the base plate.

12. A saw system comprising:
the saw guide assembly of claim 1; and
a saw having a saw blade and a shoe, the saw blade extending downward beyond a bottom side of the shoe, the shoe resting on the top of the base plate when the saw attachment arrangement secures the saw to the saw guide.

13. A method of mounting a saw to a saw guide assembly of claim 1, the method comprising:
positioning the alignment spacer such that the saw blade abutment is spaced laterally outward from the lateral side of the base plate;
abutting a saw blade of the saw against the saw blade abutment of the alignment spacer;
securing the saw to the base plate using the saw attachment arrangement; and
moving the alignment spacer relative to the base plate to disengage the saw blade from the alignment spacer.

14. A saw system comprising:
the saw guide assembly of claim 1;
a saw mounted to the base plate of the saw guide, the saw having a saw blade extending downward beyond the bottom side of the base plate of the saw guide; and
the alignment spacer removably attached to the base plate, the saw blade abutment abutting against the saw blade.

15. The saw system of claim 14, wherein the alignment spacer is removable from the base plate when the saw is secured to the saw guide assembly.

16. The method of claim 13, wherein the step of moving the alignment spacer includes removing the alignment spacer from the base plate prior to cutting with the saw.

17. The saw system of claim 14, wherein the saw includes a shoe, the shoe of the saw mounting the saw to the base plate of the saw guide assembly, the saw blade extending downward beyond a bottom side of the shoe.

18. The saw guide assembly of claim 1, wherein the alignment spacer is engageable with the base plate such that the saw blade abutment is fixed along the second axis being perpendicular to the path when the alignment spacer is engaged with the base plate and the saw is not fixed relative to the base plate.

19. The saw system of claim 14, further including:
a guide arrangement configured to laterally locate the base plate relative to the path and inhibit lateral movement of the saw guide assembly relative to a work piece when cutting a workpiece with the saw attached to the base plate as the base plate and saw travel along the path as the base plate.

* * * * *